(12) United States Patent
Sung (10) Patent No.: US 10,913,421 B2
(45) Date of Patent: Feb. 9, 2021

(54) AIR BAG APPARATUS FOR PROTECTING PASSENGER'S HEAD

(71) Applicants: Hyundai Motor Company, Seoul (KR); KIA Motors Corporation, Seoul (KR)

(72) Inventor: Il Chang Sung, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 27 days.

(21) Appl. No.: 16/276,119

(22) Filed: Feb. 14, 2019

(65) Prior Publication Data
US 2020/0164823 A1    May 28, 2020

(30) Foreign Application Priority Data
Nov. 26, 2018 (KR) .......................... 10-2018-0147348

(51) Int. Cl.
| | |
|---|---|
| *B60R 21/18* | (2006.01) |
| *B60R 21/207* | (2006.01) |
| *B60R 21/2165* | (2011.01) |
| *B60R 21/237* | (2006.01) |
| *B60R 22/18* | (2006.01) |
| *B60R 21/26* | (2011.01) |
| *B60R 21/00* | (2006.01) |

(52) U.S. Cl.
CPC ........ *B60R 21/207* (2013.01); *B60R 21/2165* (2013.01); *B60R 21/237* (2013.01); *B60R 21/26* (2013.01); *B60R 22/18* (2013.01); *B60R 2021/0048* (2013.01); *B60R 2022/1818* (2013.01)

(58) Field of Classification Search
CPC ...................................................... B60R 21/18
USPC .......................................................... 280/733
See application file for complete search history.

(56) References Cited

U.S. PATENT DOCUMENTS

| | | | |
|---|---|---|---|
| 3,933,370 A | 1/1976 | Abe et al. | |
| 5,851,055 A * | 12/1998 | Lewis | B60R 21/18 297/483 |
| 6,126,194 A | 10/2000 | Yaniv et al. | |
| 6,237,945 B1 * | 5/2001 | Aboud | B60R 21/18 280/730.2 |
| 6,382,666 B1 | 5/2002 | Devonport | |

(Continued)

FOREIGN PATENT DOCUMENTS

KR    20-0325045    8/2003

OTHER PUBLICATIONS

Non-Final Office Action for U.S. Appl. No. 15/962,749, dated Dec. 11, 2019, 15 pgs.

*Primary Examiner* — Toan C To
(74) *Attorney, Agent, or Firm* — Brinks Gilson & Lione (57) ABSTRACT

An air bag apparatus for protecting a passenger's head includes an air bag cover fixedly installed at an upper end of a seat back and an air bag cushion installed in a folded state in the air bag cover. The air bag cushion is deployed while breaking the air bag cover during supply of air bag gas from an inflator, and deployed toward one side of the passenger who is on a seat to protect the passenger's head during deployment. Accordingly, the air bag apparatus protects the passenger's head even in a situation in which a position of the seat is changed and an autonomous driving condition in which various sitting modes are arranged.

9 Claims, 6 Drawing Sheets

(56) References Cited

U.S. PATENT DOCUMENTS

| | | | |
|---|---|---|---|
| 6,688,642 B2* | 2/2004 | Sollars, Jr. | B60R 21/18 |
| | | | 280/733 |
| 7,413,220 B2 | 8/2008 | Itoga et al. | |
| 7,641,233 B2* | 1/2010 | Korechika | B60R 21/18 |
| | | | 280/753 |
| 7,905,514 B2* | 3/2011 | Thomas | B60R 22/1954 |
| | | | 280/733 |
| 8,038,170 B2* | 10/2011 | Haraoka | B60R 21/18 |
| | | | 244/122 AG |
| 8,246,077 B2* | 8/2012 | Nezaki | B60N 2/688 |
| | | | 280/733 |
| 9,944,245 B2* | 4/2018 | Moeller | B60R 21/18 |
| 9,981,623 B2* | 5/2018 | Kobata | B60R 21/18 |
| 10,336,278 B2* | 7/2019 | Schneider | B60R 21/18 |
| 2002/0105176 A1 | 8/2002 | Hammer et al. | |
| 2002/0125701 A1 | 9/2002 | Devonport | |
| 2002/0171233 A1 | 11/2002 | Grace | |
| 2005/0067820 A1 | 3/2005 | Keeslar et al. | |
| 2015/0343931 A1 | 12/2015 | Koike et al. | |
| 2016/0280171 A1 | 9/2016 | Moeller et al. | |

\* cited by examiner

AIR BAG APPARATUS FOR PROTECTING PASSENGER'S HEAD

CROSS REFERENCE TO RELATED APPLICATION

This application claims priority to and the benefit of Korean Patent Application No. 10-2018-0147348, filed on Nov. 26, 2018, which is incorporated herein by reference in its entirety.

FIELD

The present disclosure relates to an air bag apparatus for protecting the passenger, and more particularly, to an air bag apparatus for protecting the passenger's head.

BACKGROUND

The statements in this section merely provide background information related to the present disclosure and may not constitute prior art.

An autonomous vehicle is a smart vehicle that employs an autonomous technology for autonomously reaching a destination without driver's direct manipulation of a handle, an accelerator pedal, a brake, or the like, and recently, has been rapidly developed.

When an autonomous system in the autonomous vehicle is generally activated, it is possible to switch a relaxed mode, a swivel mode, and the like in which a driver takes a rest without direct driving, and it is possible to move a seat to various positions according to a passenger's request.

When a position of the seat is changed in an autonomous driving condition, we have discovered that it is not possible to safely protect the passenger by using a conventional curtain air bag.

The above information disclosed in this background section is only for enhancement of understanding of the background of the present disclosure, and therefore it may contain information that does not form the prior art that is already known to a person of ordinary skill in the art.

SUMMARY

The present disclosure provides an air bag apparatus for protecting the passenger's head even in a situation in which a position of a seat is changed and an autonomous driving condition in which various sitting modes are arranged.

According to a form of the present disclosure, an air bag apparatus for protecting a passenger's head includes an air bag cover fixedly installed at an upper end of a seat back, and an air bag cushion that is installed in a folded state in the air bag cover, is deployed while breaking the air bag cover during supply of air bag gas from an inflator, and is deployed toward one side of a passenger who is on a seat to protect the passenger's head during deployment.

The air bag apparatus may further include a belt guide that is detachably coupled to the air bag cover, is non-detachably coupled to the air bag cushion, and is configured as a movement path of a seat belt for allowing the seat belt to pass through the belt guide.

The air bag cover may be fixedly installed to a door-side edge portion among right and left edge portions of the upper end of the seat back, and the air bag cushion may protect the passenger's head while being deployed to a space between a door and the passenger's head.

Tear lines may be formed on upper and front surfaces of the air bag cover, and the air bag cushion folded in the air bag cover may break the tear lines and be deployed upward and forward.

The air bag cover and the belt guide may be maintained in a coupling state when the air bag cushion is not deployed and are detached from each other by deployment pressure when the air bag cushion is deployed, and the air bag cushion and the belt guide may also be maintained in a coupling state even when the air bag cushion is deployed.

When the air bag cushion is deployed upward and forward by breaking the tear lines, the belt guide may be moved upward while being detached from the air bag cover, and then, may guide a deployment route of the air bag cushion while being moved forward along the seat belt.

The belt guide may be positioned and coupled to an edge portion of a lower side of a front surface of the air bag cover, the air bag cushion may be coupled to an upper surface of the belt guide, and the seat belt may be installed to protrude forward through a lower surface of the air bag cover and the belt guide.

The air bag cover and the belt guide may be coupled to each other via a hook to be detached from each other by deployment pressure of the air bag cushion.

The air bag cushion and the belt guide may be coupled with any one of a coupling structure with a ring and a hanger, a sewing coupling structure, a bolt coupling structure, and a tether and bolt coupling structure, and are configured not to be detached from each other even when the air bag cushion is deployed.

According to another form of the present disclosure, an air bag apparatus for protecting a passenger's head includes an air bag cushion configured to position at a door-side edge portion of an upper end of a seat back, and a belt guide coupled to the air bag cushion and configured for allowing a seat belt to pass through, wherein the belt guide guides a deployment route while being moved forward along the seat belt when the air bag cushion is deployed, and the air bag cushion is deployed toward one side of a passenger who is on a seat to protect the passenger's head in a state in which the deployment route is guided by the belt guide.

The air bag cushion may be deployed toward one side the passenger who is on the seat while being deployed in upward and forward directions of the seat back.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an air bag apparatus for protecting the passenger's head according to a form of the present disclosure is described with reference to the accompanying drawings.

As shown in FIGS. 1 to 5D, the air bag apparatus for protecting the passenger's head according to the present disclosure may include an air bag cover 10 that is fixedly installed at an upper end of a seat back 1, an air bag cushion 30 that is installed in a folded state in the air bag cover 10, is deployed while breaking the air bag cover 10 during supply of air bag gas from an inflator 20, and is deployed toward one side of a passenger who is on a seat to protect the passenger's head 2 during deployment, and a belt guide 40 that is detachably coupled to the air bag cover 10, is non-detachably coupled to the air bag cushion 30, and is configured for a movement path of a seat belt 3 by allowing the seat belt 3 to pass through the belt guide 40.

Figure 1:
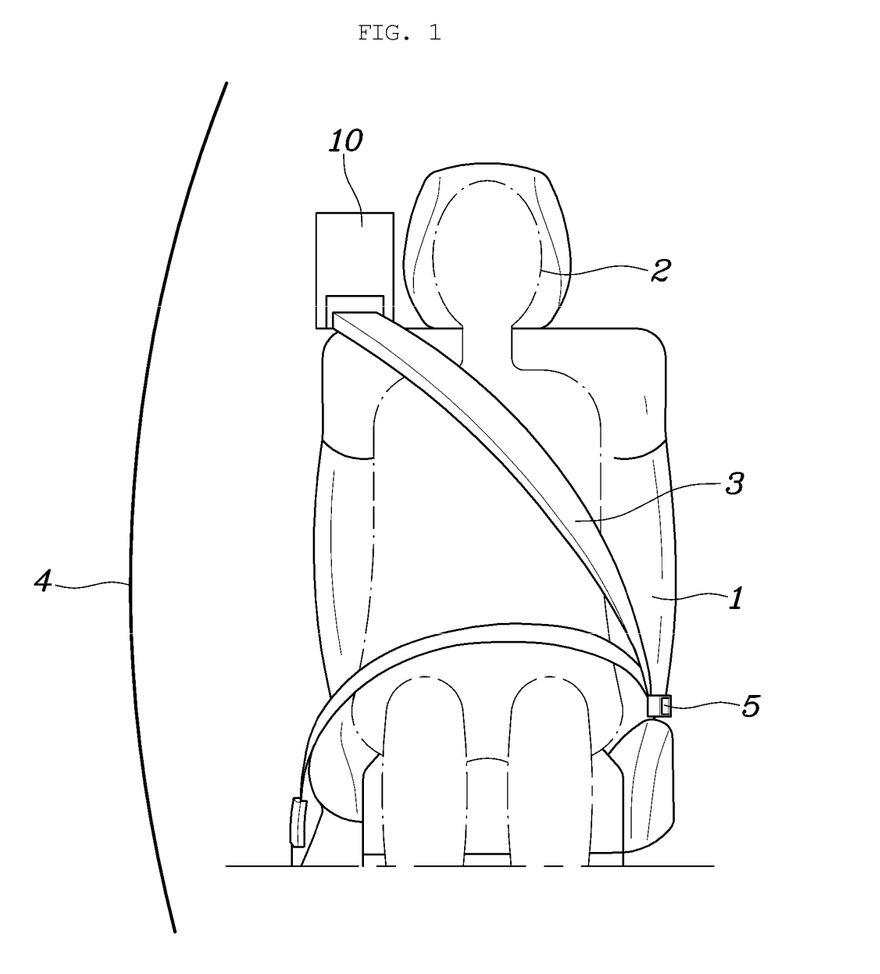
FIG. 1 is a front view showing the case in which an air bag apparatus for protecting a passenger's head according to the present disclosure is installed at a door-side edge portion of an upper end of a seat back.
Figure 4:
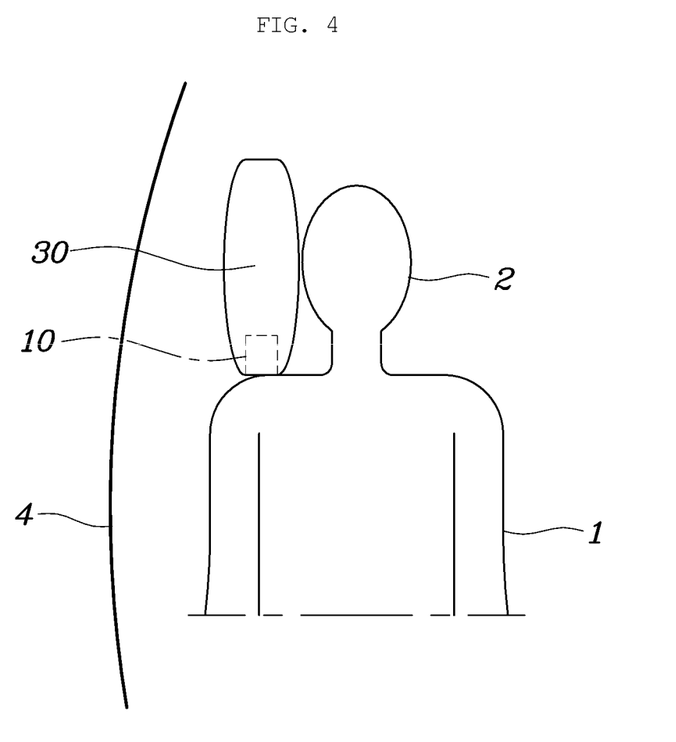
FIG. 4 is a diagram of a passenger who has a seat in the state of FIG. 3 viewed from the front.

The air bag cover 10 may be a component that is fixedly installed to a door-side edge portion adjacent to a door 4 among right and left edge portions of the upper end of the seat back 1, and the air bag cushion 30 may be a component that protects the passenger's head 2 while being deployed to a space between the door 4 and the passenger's head 2.

According to the present disclosure, the air bag cover 10 may be fixedly installed at the door-side edge portion of the upper end of the seat back 1, and the seat belt 3 that is drawn out of the air bag cover 10 to extend across the chest from the shoulder to the main part of the passenger in a diagonal direction.

One end of the seat belt 3 may be connected to be wound around a retractor installed at a lower portion of a rear surface of the seat back 1, and on the other end of the seat belt 3 may include a tongue that is detachably coupled to a buckle 5 installed at a lower portion of a front surface of the seat back 1, and accordingly, a passenger who is on a seat may be maintained in a restraint state via the seat belt 3.

Figure 2:
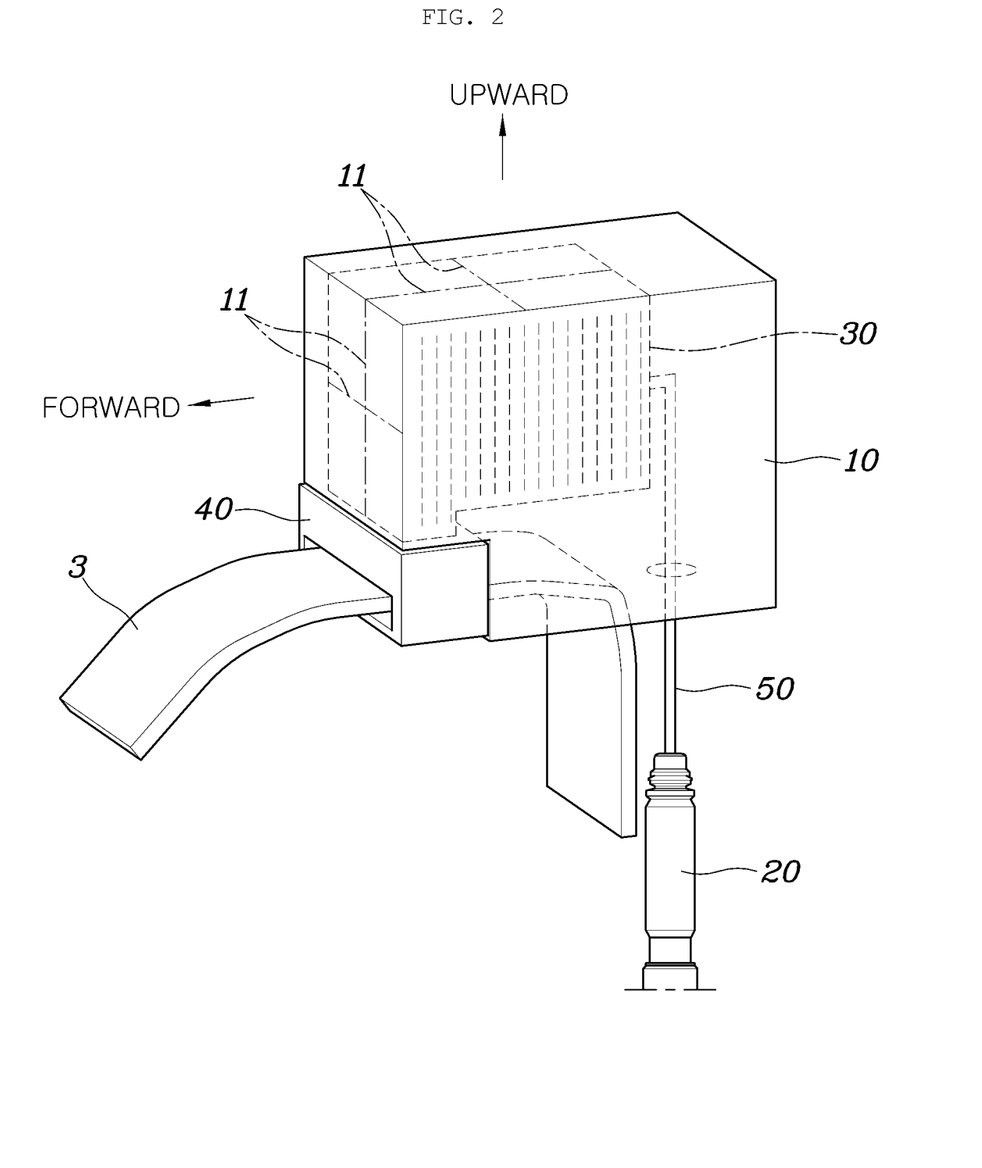
FIG. 2 is a diagram illustrating an air bag apparatus for protecting a passenger's head according to the present disclosure.

The inflator 20 may be fixedly installed to a seat back frame to be positioned on the rear surface of the seat back 1, and the inflator 20 and the air bag cushion 30 may be connected through a gas guide 50 including a pipe or a hose.

The inflator 20 may be arranged in the air bag cover 10, but in this case, a full size of the air bag cover 10 may be increased to provide an installation space of the inflator 20. Accordingly, the inflator 20 may be installed to position on the rear surface of the seat back 1 for avoiding the increased size of the air bag cover 10. The air bag gas generated during explosion of the inflator 20 may be transferred to the air bag cushion 30 through the gas guide 50, and the air bag cushion 30 may receive the air bag gas to be expansively deployed.

According to the present disclosure, tear lines 11 may be formed on upper and front surfaces of the air bag cover 10, and the air bag cushion 30 folded in the air bag cover 10 may break the tear line 11 and may be deployed in upward and forward directions of the air bag cover 10 while being deployed upon receiving the air bag gas.

Figure 3:
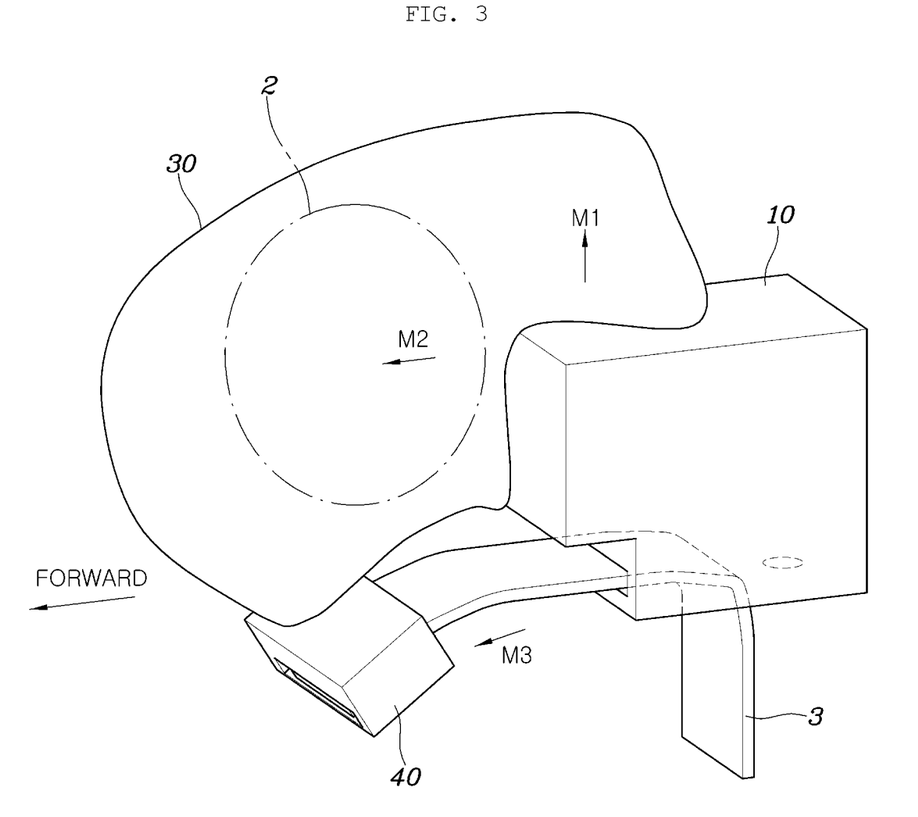
FIG. 3 is a diagram showing a state in which an air bag cushion is deployed in FIG. 2.

The air bag cover 10 and the belt guide 40 may be maintained in a coupling state when the air bag cushion 30 is not deployed, but they may be detached from each other by deployment pressure when the air bag cushion 30 is deployed. In addition, the air bag cushion 30 and the belt guide 40 may be maintained in a coupling state even when the air bag cushion 30 is deployed.

Accordingly, when the air bag cushion 30 is deployed upon receiving air bag gas, the air bag cushion 30 may break the tear line 11 of the air bag cover 10 and may be deployed upward (arrow M1) and forward (arrow M2). The belt guide 40 coupled to the air bag cushion 30 may be moved upward when breaking the tear line 11 and being moved upward (arrow M1), and continuously, the air bag cushion 30 may be moved forward (arrow M3) along the seat belt 3 to guide a deployment route of the air bag cushion 30 when breaking the tear line 11 and being moved forward (arrow M2).

When the air bag cushion 30 is deployed, the air bag cushion 30 may break the tear line 11 and may be moved upward (arrow M1), the belt guide 40 coupled to the air bag cushion 30 may also be moved upward together, and thus, the belt guide 40 may be moved in an upper direction of the shoulder of the passenger to be moved away from the shoulder. Accordingly, contact between the belt guide 40 and the shoulder of the passenger may be avoided, thereby the shoulder of the passenger is free from being hurt by the belt guide 40.

The air bag cushion 30 may be simultaneously moved upward and forward, and thus, the belt guide 40 may guide a deployment route of the air bag cushion 30 while being moved forward along the seat belt 3, and accordingly, the air bag cushion 30 may more effectively protect the passenger's head 2 while being deployed to one side of a passenger between the door 4 and the passenger.

According to the present disclosure, the belt guide 40 may be positioned and coupled to an edge portion of a lower side of a front surface of the air bag cover 10. In addition, the air bag cushion 30 may be coupled to an upper surface of the belt guide 40, and the seat belt 3 may be installed to protrude forward through a lower surface of the air bag cover 10 and the belt guide 40.

Figure 5A:
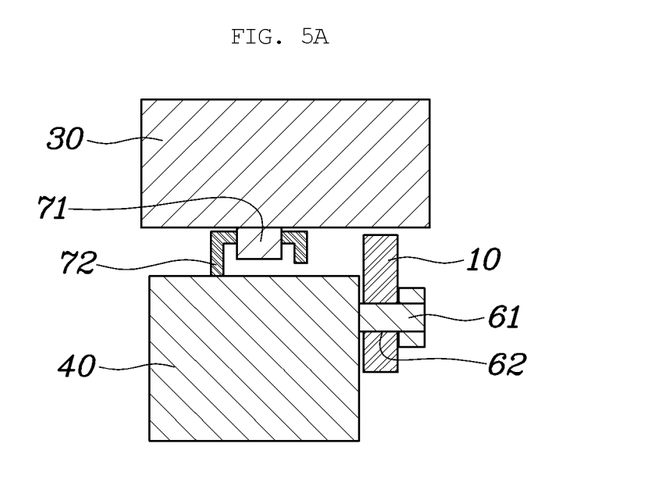
FIGS. 5A-5D are diagrams illustrating coupling structures of an air bag cover and a belt guide, and coupling structures of an air bag cushion and a belt guide according to the present disclosure.

The air bag cover 10 and the belt guide 40 may be maintained in a coupled state when the air bag cushion 30 is not deployed, and may be easily detached by deployment pressure when the air bag cushion 30 is deployed, and to this end, as shown in FIG. 5A, the belt guide 40 may include a hook 61 and the air bag cover 10 may include a hook hole 62, and accordingly, the hook 61 may be inserted into the hook hole 62 to be coupled therewith.

On the other hand, the belt guide 40 may include a hook hole, and the air bag cover 10 may include a hook.

In addition, the air bag cushion 30 and the belt guide 40 may always be coupled each other to be non-detachably coupled when the air bag cushion 30 is not deployed and is also deployed, and to this end, as shown in FIG. 5A, the air bag cushion 30 may include a ring 71 and the belt guide 40 may include a hanger 72. Accordingly, the air bag cushion 30 and the belt guide 40 may be coupled to each other by using the ring 71 and the hanger 72.

Figure 5B:
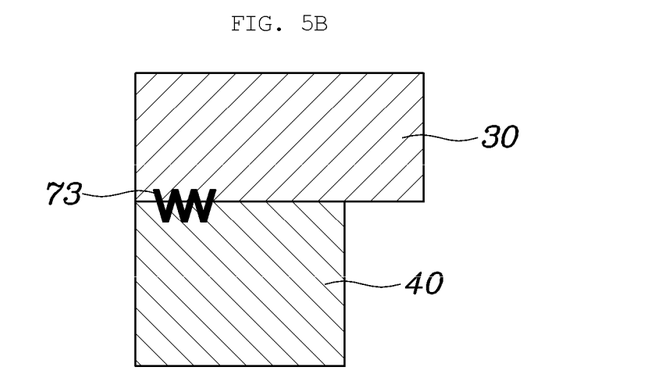
Figure 5C:
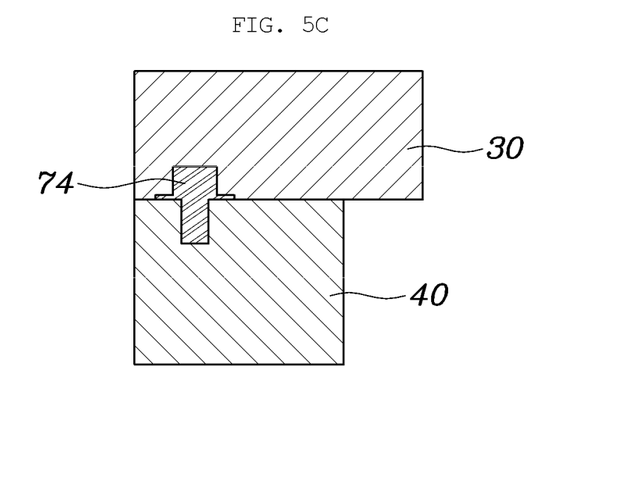
Figure 5D:
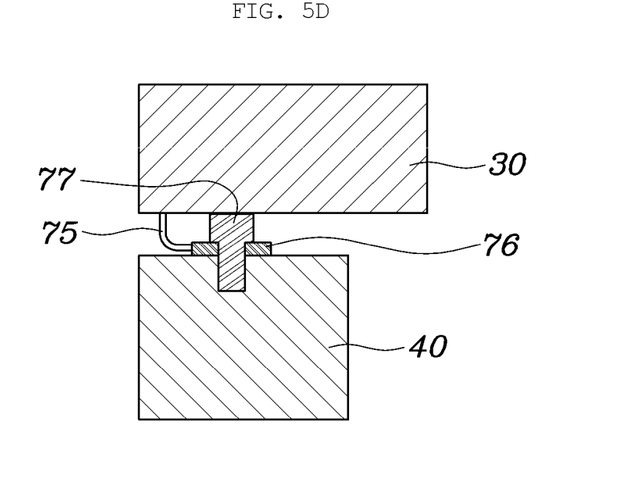

According to other forms of the present disclosure, as shown in FIG. 5B, the air bag cushion 30 and the belt guide 40 may be configured with a sewing coupling structure by sewing contact portions 73 therebetween. As shown in FIG. 5C, in addition, the air bag cushion 30 and the belt guide 40 may be configured with a bolt coupling structure by coupling contact portions therebetween using a bolt 74 as a medium, or as shown in FIG. 5D, the air bag cushion 30 may include a tether 75, and a bracket 76 coupled to the tether 75. The bracket 76 and the belt guide 40 may be configured with a tether and bolt coupling structure in which the bracket 76 and the belt guide 40 are coupled by using a bolt 77.

As described above, the air bag apparatus for protecting the passenger's head according to forms of the present disclosure may be configured in such a way that the air bag cover 10 is installed at a position of a door-side edge portion of the upper end of the seat back 1, the air bag cover 10 includes the air bag cushion 30, and the belt guide 40 is detachably coupled to the air bag cover 10 and is non-detachably coupled to the air bag cushion 30. Accordingly, when the air bag cushion 30 is deployed, the belt guide 40 may guide a deployment route of the air bag cushion 30 while being moved forward along the seat belt 3, and the air bag cushion 30 may advantageously and more safely protect the passenger's head 2 while being deployed toward one side of a passenger who is on a seat while the deployment route is guided by the belt guide 40.

In particular, the air bag apparatus according to the present disclosure may advantageously, more effectively, and safely protect the passenger's head 2 by the air bag cushion 30 deployed from the upper end of the seat back 1 even in a situation in which a position of a seat is changed and an autonomous driving condition in which various sitting modes can be arranged.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. An air bag apparatus for protecting a passenger's head, the air bag apparatus comprising:
    an air bag cover fixedly installed at an upper end of a seat back;
    an air bag cushion installed in a folded state in the air bag cover, the air bag cushion being deployed while breaking the air bag cover during supply of air bag gas from an inflator, and deployed toward one side of a passenger who is on a seat to protect the passenger's head during deployment; and
    a belt guide that is detachably coupled to the air bag cover, is non-detachably coupled to the air bag cushion, and is configured as a movement path of a seat belt for allowing the seat belt to pass through the belt guide,
    wherein the air bag cover and the belt guide are coupled to each other via a hook to be detached from each other by deployment pressure of the air bag cushion.

2. The air bag apparatus of claim 1, wherein:
    the air bag cover is fixedly installed to a door-side edge portion among right and left edge portions of the upper end of the seat back; and
    the air bag cushion protects the passenger's head while being deployed to a space between a door and the passenger's head.

3. The air bag apparatus of claim 1, wherein:
    tear lines are formed on upper and front surfaces of the air bag cover; and
    the air bag cushion folded in the air bag cover breaks the tear lines and is deployed upward and forward.

4. The air bag apparatus of claim 1, wherein:
    the air bag cover and the belt guide are maintained in a coupling state when the air bag cushion is not deployed, and are detached from each other by deployment pressure when the air bag cushion is deployed; and
    the air bag cushion and the belt guide are maintained in a coupling state even when the air bag cushion is deployed.

5. The air bag apparatus of claim 3, wherein, when the air bag cushion is deployed upward and forward by breaking the tear lines, the belt guide is moved upward while being detached from the air bag cover, and then, guides a deployment route of the air bag cushion while being moved forward along the seat belt.

6. The air bag apparatus of claim 1, wherein:
    the belt guide is positioned and coupled to an edge portion of a lower side of a front surface of the air bag cover;
    the air bag cushion is coupled to an upper surface of the belt guide; and
    the seat belt is installed to protrude forward through a lower surface of the air bag cover and the belt guide.

7. The air bag apparatus of claim 1, wherein the air bag cushion and the belt guide are coupled with any one of a coupling structure with a ring and a hanger, a sewing coupling structure, a bolt coupling structure, and a tether and bolt coupling structure, and are configured not to be detached from each other even when the air bag cushion is deployed.

8. An air bag apparatus for protecting a passenger's head, the air bag apparatus comprising:
    an air bag cover fixedly installed at an upper end of a seat back;
    an air bag cushion configured to position at a door-side edge portion of the upper end of the seat back; and
    a belt guide coupled to the air bag cushion, the belt guide being configured for allowing a seat belt to pass through,
    wherein:
    the air bag cover and the belt guide are coupled to each other via a hook to be detached from each other by deployment pressure of the air bag cushion;
    the belt guide guides a deployment route while being moved forward along the seat belt when the air bag cushion is deployed; and
    the air bag cushion is deployed toward one side of a passenger who is on a seat to protect the passenger's head in a state in which the deployment route is guided by the belt guide.

9. The air bag apparatus of claim 8, wherein the air bag cushion is deployed toward one side of the passenger who is on the seat while being deployed in upward and forward directions of the seat back.

\* \* \* \* \*